Nov. 6, 1923.
J. A. COSTELLO
VALVE
Filed May 5, 1920
1,473,210
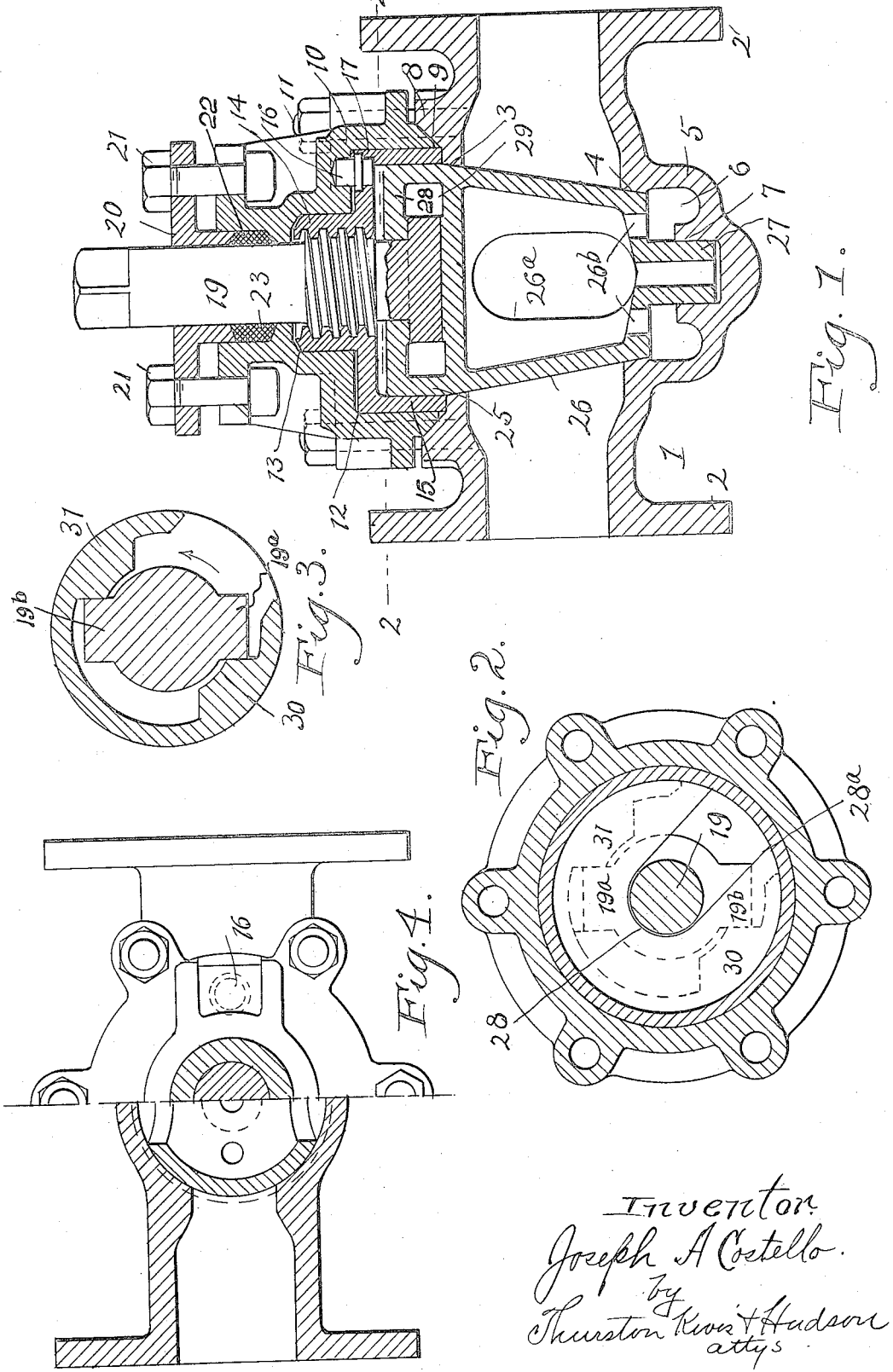
Inventor
Joseph A Costello.
by
Thurston Knox & Hudson
attys Patented Nov. 6, 1923.

1,473,210

UNITED STATES PATENT OFFICE.

JOSEPH A. COSTELLO, OF CLEVELAND, OHIO, ASSIGNOR TO THE CLEVELAND BRASS MANUFACTURING COMPANY, OF CLEVELAND, OHIO, A CORPORATION OF OHIO.

VALVE.

Application filed May 5, 1920. Serial No. 379,071.

*To all whom it may concern:*

Be it known that I, JOSEPH A. COSTELLO, a citizen of the United States, residing at Cleveland, in the county of Cuyahoga and State of Ohio, have invented a certain new and useful Improvement in Valves, of which the following is a full, clear, and exact description.

The present invention relates to valves.

One of the objects of the invention is to provide a valve which during the opening movement is first raised in a linear direction from its seat and subsequently turned until the openings in the valve are in position to afford passage of fluid through the valve. This provision of lifting the valve before turning the same, frees the valve body from its seat and makes the opening operation easy of performance.

An additional object is to provide a construction wherein when the valve is moved to its closed position, the valve is first moved toward its seat and subsequently is turned to its closed position, the valve simultaneously having a linear motion as well as a turning motion so that the general effect is a spiral movement of the valve body which results in a very effective seating of the valve body.

A further object is to provide an adjustment by which wear in the operating parts of the valve may be compensated.

A further object is to provide a valve so constructed as to be self-cleaning with respect to sediment which may collect in the valve.

Other objects will appear more at large as the description proceeds.

Reference should be had to the accompanying drawings forming a part of this specification in which Fig. 1 is a transverse section of a valve; Fig. 2 is a section on the line 2—2 of Fig. 1; Fig. 3 is a transverse section of the valve proper; Fig. 4 is a top plan view with portions in section of the valve.

Referring to the drawings, 1 indicates a hollow body having open ends, the body at its end portion being provided with flanges such as indicated at 2, by means of which the valve may be fastened in the pipe line with which it is to be associated.

The valve body has two oppositely disposed openings which are adapted to receive the valve proper, these openings being indicated at 3 and 4 respectively and are each provided with a slanting wall which cooperates with a slanting body wall of the valve proper. Extending from the body 1 is a chambered extension 5 which provides a sediment space 6 and has a central portion with a depression 7 formed therein, the purpose of which will be later described. Surrounding the opening 3 in the body 1 is a wall 8 which has a slanting surface indicated at 9. This surface 9 cooperates with a similar surface formed at the lower edge of a head or bonnet 10. The head is secured to the body of the valve by means of a bolt and nut structure as indicated at 11.

Within the head there is an annular recess 12 and an annular recess 13 which is of less diameter than the recess 12. These recesses receive a nut structure which comprises a part 14 that occupies the recess 13 and a flanged portion 15 which occupies the recess 12.

Relative rotation between the nut structure 14 and the head 10 is prevented by means of a pin 16 which extends through an opening in the head and into an opening 17 which is in the nut structure.

The inner side of the portion 14 is provided with threads and is adapted to receive the threaded portion 18 of a valve stem 19. The valve stem cooperates with a suitable bushing or gland nut 20, which surrounds the stem 19 and is held to the head by means of a bolt and nut construction as indicated at 21. The member 20 compresses a packing 22 which occupies a recess 23 formed in the outer end of the head.

The valve body proper comprises a head portion 25, an intermediate portion 26 and an extension at the end of the intermediate portion which is indicated at 27.

The head portion of the valve as indicated at 25 has a central portion 28 through which the valve stem extends and the head is also provided with a chamber such as indicated at 29 which is adapted to receive the end of the valve stem. The inner wall of the chamber 29 is provided with projections or stop members which are indicated at 30 and 31 and are oppositely disposed. These extensions 30 and 31 are adapted to be engaged by extensions 19$^a$ and 19$^b$ which are formed with or carried by the end of the valve stem. The extensions 19ª and 19ᵇ being positioned within the chamber 29.

As will be noted in Fig. 2, the opening 28 communicates with a slot 28ª which is formed in the end of the head portion 25 which is for the purpose of permitting the valve stem 19 to be assembled with respect to the head portion 25 of the valve proper.

As shown in Fig. 2 the extensions 19ª and 19ᵇ are in engagement with the projections 30 and 31 carried by the valve proper, hence if right hand rotation be imparted to the valve stem 19 the valve proper will be moved in a clockwise direction. On the other hand if the valve stem 19 be turned in a counterclockwise direction, the projections 19ª and 19ᵇ will move through an arc of 90° before re-engaging with the projections 30 and 31 and after such engagement the valve body proper is rotated.

The intermediate portion of the valve body proper is provided with a slanting wall which is complementary to the slanting walls 3 and 4 before described so that when the valve is seated, engagement between these complementary walls takes place.

The intermediate portion of the valve is provided with oppositely disposed openings, one of which is indicated at 26ª so that when the valve body is in the position 90° removed from that shown in Fig. 1, the valve is in open position.

The end portion of the part 26 of the valve proper is provided with one or more openings as indicated at 26ᵇ which communicate with the sediment chamber 6, thus any sediment which remains in the valve body may settle through the openings 26ᵇ and into the chamber 6. When the valve proper is turned to an open position, the water passing through the openings in the valve proper will in part circulate through the openings 26ᵇ and through the sediment chamber 6 and carry out the sediment. From the foregoing it will be seen that the valve is self-cleaning, in that when the valve is in open position the flow of water will remove the sediment which has previously gathered.

The extension 27 occupied the recess 7 which is formed in the extension 5 of the valve body 1. This extension 27 has a working fit in the recess and serves as a guide to prevent any lateral displacement of the valve proper in its operation.

At the opposite end of the valve proper the outer wall of the head portion 25 bears upon the inner wall part 15 of the nut structure so that the head of the valve is guided during movement of the valve body proper. Thus it will be seen that both ends of the valve body proper are guided during movement.

As shown in the drawings, the valve proper is in closed position and if it be desired to open the valve, the stem 19 is turned in a counterclockwise direction. During the first quarter turn the valve stem 19 will move outwardly due to the threaded engagement before described and the projections 19ª and 19ᵇ while moving will bear upon the end of the valve proper and raise the valve proper from its seat. The amount of movement of the valve proper is not very great but is sufficient to unseat the valve so as to make the subsequent turning movement of the valve an easy operation. The movement therefore of the valve proper during the first quarter turn of the valve stem is a pure linear movement.

At the end of the quarter turn the projections 19ª and 19ᵇ will engage with the projections 30 and 31 and not in the relationship shown in Fig. 2, but 90° from such position. As soon as the engagement just referred to takes place, the valve proper is rotated and further raised and by the completion of the next quarter turn, the openings 26ª in the valve proper will be turned 90° or to open position. Upward movement of the valve proper is limited by engagement of the head of the valve proper with the inner wall of the nut structure.

In closing operation of the valve the first quarter turn of the valve stem moves the valve proper toward its seat by a linear movement and during this movement the projections 19ª and 19ᵇ will have moved into engagement with the projections 30 and 31 and during the next quarter turning movement of the valve stem, the valve proper will be simultaneously turned until the openings 26ª in the valve proper occupy the positions as indicated in Fig. 1 and the valve seated. As will be noted, the final seating movement of the valve proper is a spiral movement which insures a complete and tight closure of the valve.

During the linear movement of the valve, the valve is guided by the projection 27 carried by the valve proper and by the engagement with the inner wall of the part 15 of the nut structure.

The operating construction described provides for rapid operation of the valve and overcomes any sticking of the valve proper on the opening operation.

Wear between the valve stem threads and the portion 14 of the nut structure may be compensated by removing the pin 16, turning the nut structure and providing a new recess 17 with which the pin 16 may cooperate.

Having described my invention, I claim:

1. A valve structure comprising a valve proper, a seat for the valve proper, means for operating the valve to move it to open or closed position, said means during the closing operation moving the valve toward the seat in a linear direction without rotation and subsequently causing the valve to rotate and still moving in a linear direction while moving into contact with its seat.

2. A valve structure comprising a body portion having a passageway, a valve proper having a seat in the body portion and controlling the said passageway, means for moving the valve proper to open or closed position, said means when moving the valve to closed position causing the valve proper to move in a linear direction toward its seat through a portion of its movement and subsequently simultaneously turning the valve and moving it in a linear direction into engagement with its seat.

3. A valve structure comprising a body portion having a passageway and oppositely disposed openings through the walls of said passageway and forming a seat, a valve proper extending transversely of the passageway and cooperating with the said openings in the wall, means for operating the valve proper to open or closed position, said means causing the valve proper during an opening or closing operation to first move in a linear direction toward or away from its seat and subsequently move with a linear and rotating movement into engagement with its seat or off its seat.

4. A valve structure comprising a body portion having a passageway therethrough, oppositely disposed openings in the wall of the body portion, the wall of said openings being provided with slanting surfaces and adapted to form a valve seat, a valve proper extending transversely of said passageway and having a tapered body which cooperates with the said slanting wall of the said openings, means for moving the valve to open or closed position, the said means during an opening or closing operation first moving the valve in a linear direction and subsequently moving the valve with a combined linear and rotary movement into engagement with its seat or away from the seat.

5. A valve structure comprising a body portion having a passageway, oppositely disposed openings in the wall of the passageway and forming a valve seat, a valve proper extending transversely of the passageway and cooperating with said openings, cooperating means between the opposite ends of the valve proper and the body portion for guiding said valve proper in a linear direction, a valve stem mounted independently of the valve proper, means by which the valve stem and valve proper are connected for operating the valve proper whereby on opening or closing the valve proper it is first moved from or toward its seat and subsequently rotated to open or closed position.

6. A valve structure comprising a body portion having a passageway, oppositely disposed openings in the walls of the passageway, a valve proper extending transversely of the passageway and cooperating with said openings, said valve proper having a head portion, means cooperating with the head portion to guide it when moved in a linear direction, an extension at the opposite end of the valve proper, means on the body portion cooperating with the extension to guide the same during the linear movement of the valve proper, a valve stem mounted independently of the valve proper, means by which the valve stem and valve proper are connected for operating the valve proper whereby on opening or closing the valve proper it is first moved toward or from its seat and subsequently rotated to open or closed position.

7. A valve structure comprising a body portion having a passageway, oppositely disposed openings in the walls of the passageway, a hollow valve proper extending transversely of the passageway and cooperating with said openings, a chambered extension carried by the said body portion and adjacent one of the openings with which the valve proper cooperates, the said hollow valve body being provided with a pair of openings which communicate with said chamber and means for operating the valve proper.

8. A valve structure comprising a body portion having a passageway, oppositely disposed openings in the walls of the passageway and forming a valve seat, a valve proper extending transversely of the passageway and cooperating with the said openings, the valve proper being provided with a head and nut member having a depending flanged portion which cooperates with the said head of the valve, said nut member having a threaded portion, a valve stem which cooperates with the threaded portion and means whereby the nut structure may be adjusted with respect to the valve stem.

9. A valve structure comprising a valve proper, a seat for the valve proper, a valve stem mounted independently of the valve proper and having limited rotary movement with respect thereto, a stop member carried by the valve proper with which portions of the valve stem engage during the rotation of the valve stem, and means coacting with the stem to move the valve toward or from its seat upon rotation of the stem.

10. A valve structure comprising a valve proper, a seat for the valve proper, a valve stem having a swivel connection with the valve proper, cooperating members upon the valve stem and the valve proper for effecting engagement as the valve stem is turned and threaded means cooperating with the valve stem.

11. A valve structure comprising a valve proper, a seat for the valve proper, a head portion of the valve proper provided with an opening, a valve stem extending through said opening and having spaced projections which lie within said head of the valve, spaced cooperating members carried by the valve stem whereby the valve stem may have a limited rotary movement independent of the valve proper and adapted to engage during rotation of the valve stem, and a threaded connection whereby the valve stem is moved longitudinally during a threaded operation.

In testimony whereof, I hereunto affix my signature.

JOSEPH A. COSTELLO.